July 29, 1941.     B. J. PIERSON     2,250,649
PRESS
Filed Oct. 7, 1938     6 Sheets-Sheet 2

Inventor
B. J. PIERSON

July 29, 1941. B. J. PIERSON 2,250,649
PRESS
Filed Oct. 7, 1938 6 Sheets-Sheet 3

Inventor
B. J. PIERSON
By
Attorney

July 29, 1941.  B. J. PIERSON  2,250,649
PRESS
Filed Oct. 7, 1938  6 Sheets-Sheet 5

Inventor
B. J. PIERSON

Patented July 29, 1941

2,250,649

UNITED STATES PATENT OFFICE 2,250,649

PRESS

Benjamin J. Pierson, Johnstown, N. Y., assignor, by mesne assignments, to Formrite Bacon Press Corporation, Colonie, West Albany, N. Y., a corporation of New York Application October 7, 1938, Serial No. 233,873

35 Claims. (Cl. 100—57)

This invention relates to presses, and more particularly to a press for meat products and especially bacon bellies.

In the marketing of bacon bellies, it is the common practice to slice the bacon and market it in stores wrapped in transparent paper or the like. It is highly desirable, of course, for the individual strips of bacon to be the same length and of uniform width in order to present the best and most appetizing appearance. Such bacon is commonly referred to as "No. 1" quality and commands the highest price in the retail market.

After a bacon belly has been cured it is quite irregular in shape, particularly as to the ends, while the belly is also quite irregular in thickness. Accordingly, in slicing the meat transversely of the belly, the first few slices usually are so small as to constitute scrap meat. The next few slices are sufficiently long for use but are materially shorter than the width of the belly and accordingly are classed as "No. 2" quality. A ready market for such a product is not always available and the product must be sold at a material reduction in price. The slices which constitute scrap and "No. 2" quality sometimes amount to as much as seven per cent. by weight of the belly as a whole, and packing houses accordingly suffer substantial losses over a period of time due to the necessity for selling the lower quality bacon at a reduced price and embodying the scrap bacon in relatively low priced prepared meat products.

An important object of the present invention is to provide a novel press structure which is particularly adapted for use in pressing bacon bellies to reform them into substantially rectangular shape with the thickness of the meat substantially uniform from end to end, whereby substantially all of a belly may be sliced into a "No. 1" quality product.

More specifically, an important object of the invention is to provide a novel press mechanism which is readily controllable by a single handle to permit the complete pressing operation of a bacon belly to be completed in a few seconds, thus permitting large numbers of bellies to be handled every day with a single press.

A further object is to provide a press structure which is instantly controllable from a single handle to effect a pressing action longitudinally, transversely and vertically with respect to a bacon belly to quickly form it into the accurate rectangular shape referred to.

A further object is to provide a press of the character referred to wherein three hydraulic rams are provided to perform the three-directional operations respectively, and to provide a single control valve mechanism for the rams to permit them to be readily controlled.

A further object is to provide a novel system for controlling the subjection of the rams to hydraulic pressure whereby the pressing of the belly transversely of the faces thereof takes place subsequently to the longitudinal and lateral edgewise pressing of the meat to provide a highly effective pressing operation which can be carried out in a minimum length of time.

A further object is to provide a control system for the hydraulic rams whereby the single control handle referred to is operable for simultaneously releasing pressures from all of the rams to permit them to quickly return to their normal or inoperative positions.

A further object is to provide a novel press of the character referred to wherein the vertical ram is arranged beneath the press and exerts an upward force against the lower face of the belly, and to provide a slide over the top of the belly constituting a bed plate which is readily accessible for movement toward and away from operative position to facilitate the placing of the bellies in the press and their removal therefrom.

A further object is to provide a novel platen structure and supporting means therefor to permit the platen structure to be reduced in size when the pressing operation takes place without the necessity for providing a structure wherein the platen is permitted to extend beyond the edges of the pressing chamber as the latter is reduced in size during the pressing operation.

A further object is to provide a sectional platen the respective elements of which are formed of thin sheets whereby they are adapted to slide relative to each other, and to provide an effective expansible and contractable supporting structure for the platen elements whereby the latter are effectively supported in flat shape during the pressing operation.

A further object is to provide a novel control valve for supplying fluid under pressure to the various rams and for simultaneously releasing the pressure from the rams, together with means operative in conjunction therewith for by-passing the fluid from the source of pressure back to a suitable reservoir thus permitting the pressure pump to operate constantly instead of being started and stopped for each operation of the press.

Other objects and advantages of the invention will become apparent during the course of the following description.

In the drawings I have shown one embodiment of this invention. In this showing.

Figure 3:
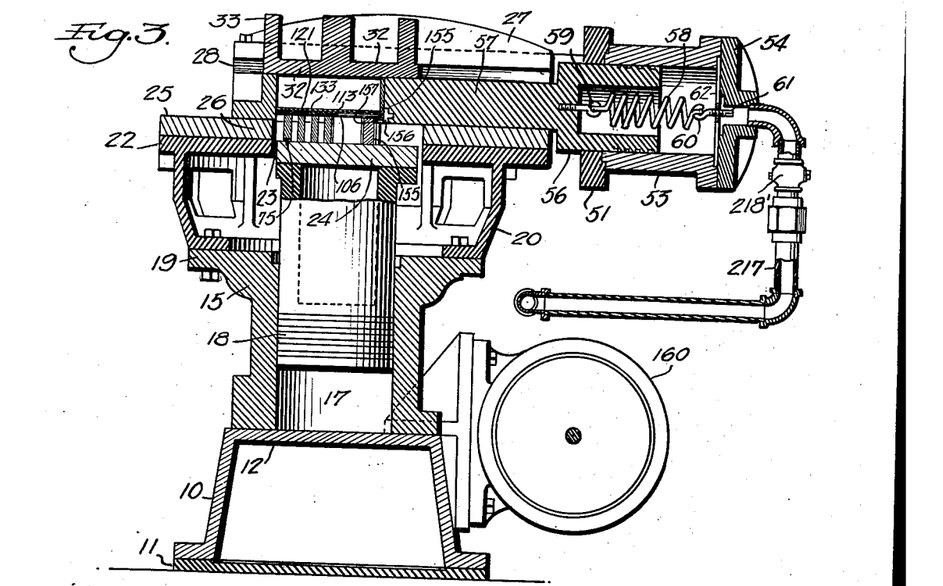
Figure 3 is a vertical sectional view on line 3—3 of Figure 2.
Figure 4:
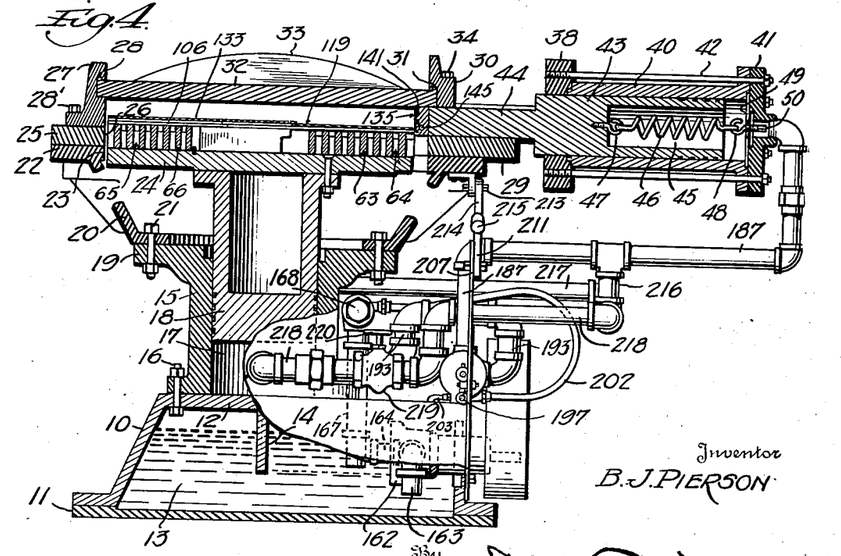
Figure 4 is a similar view on line 4—4 of Figure 2.

Referring to the drawings the numeral 10 designates a hollow base structure for the apparatus which is secured to a preferably solid bottom plate 11, adapted to rest on the floor or other supporting surface. It will become apparent that it is unnecessary for the apparatus to be secured to the floor. The base 10 is elongated in one direction as will be apparent from a comparison of Figure 3 with Figures 1 and 4, for a purpose to be described. The base is provided with a top wall 12 and accordingly constitutes with the bottom plate 11 a closed container. This container is adapted to serve as a reservoir for the oil used in the system, as will be described, the body of oil being indicated in Figure 4 by the numeral 13. It will become apparent that the top wall 12 of the base is subjected to substantial weight and pressures, and accordingly it is preferably provided with one or more stiffening ribs 14 (Figure 4).

A pedestal 15 is supported on the top wall 12 and is secured thereto as at 16. This pedestal is bored to provide a cylinder 17 in which is mounted a piston 18 to provide the lower or vertical hydraulic ram to be referred to in detail later. The top of the pedestal 15 is flanged as at 19 to provide a supporting surface for a support 20 which is bolted to the flange 19 as at 21. The support 20 is preferably an integral casting and flares toward its upper end to provide a rectangular frame 22 lying in a horizontal plane. The frame 22 is provided with a rectangular opening 23 in which is arranged a rectangular lower pressure plate 24 secured to the upper end of the piston 18. During the operation of the apparatus, the introduction of oil under pressure into the lower end of the cylinder 17 will cause the piston 18 to move upwardly whereby the plate 24 exerts upward force to transmit a compresing force to the bacon belly in a manner to be described.

A relatively thick plate 25 is arranged on the flange 22 and is provided with a substantially rectangular opening 26 coinciding with the opening 23. A member 27 extends transversely of the apparatus and has a vertical inner wall the lower portion of which constitutes one wall of the press chamber as will be described. The member 27 and the adjacent side of the plate 25 are secured by screws or the like 28' to the flange 22. The inner face of the member 27 is provided with a guide 28 for a purpose to be described. One side of the plate 25, as indicated by the numeral 29, is somewhat larger than the opposite side of the plate for a purpose which will become apparent. Such side of the plate 25 supports a guide member 30 the inner face of which is provided with a guideway 31 similar to the guideway 28, and these guideways slidably support a relatively heavy plate 32 having stiffening ribs 33 on its upper face. It will become apparent that the plate 32 is the stationary horizontal plate of the press chamber, such chamber lying below the plate 32.

The guide member 30 and the adjacent side of the plate 29 are secured by screws or the like 34. The guide member 30 is provided with extensions 35 and 36 projecting away from the press chamber and provided with parallel guides 37. The portion of the guide member 30 in which the guideway 31 is formed bridges across and rigidly connects the portions of the member lying on oposite sides of the space between the guides 37.

Figure 1:
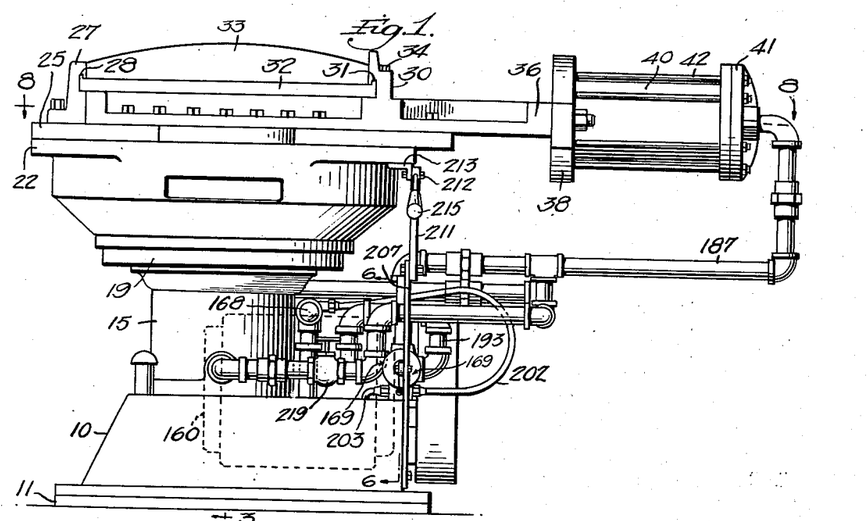
Figure 1 is a front elevation of the apparatus.
Figure 2:
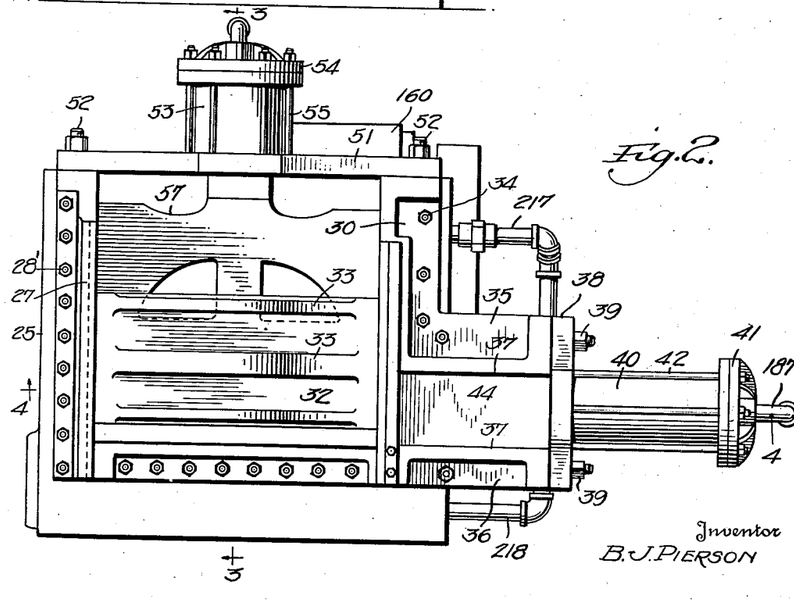
Figure 2 is a plan view of the same.

Referring to Figures 1 and 4, the numeral 38 designates a heavy plate extending transversely of the ends of the projections 35 and 36 and bolted thereto as at 39. A cylinder 40 is arranged against the outer face of the plate 38 and is provided with a head 41 at its outer end. Bolts 42 secure the head 41 with respect to the cylinder 40 and also secure the cylinder 40 to the plate 38. A piston 43 is reciprocable in the cylinder 40 and is preferably formed integral with a plate 44 which operates over the adjacent portion 29 of the plate 25 and between the guides 37 (Figure 2). The end of the piston 43 toward the head 41 is hollow as indicated at 45. A tension spring 46 is mounted within the opening 45 and is secured at one end as at 47 to the piston. The other end of the spring is connected to a hook 48 threaded in a spider member 49 and provided with a hexagonal end 50 whereby it may be turned to adjusted positions prior to being connected to the spring. The spring 46 obviously retracts the piston 43 and upon the introduction of pressure into the outer end of the cylinder, the piston 43 is moved inwardly to transmit a compression force to the adjacent end of a bacon belly as will become apparent.

Figures 8, 9, 10:
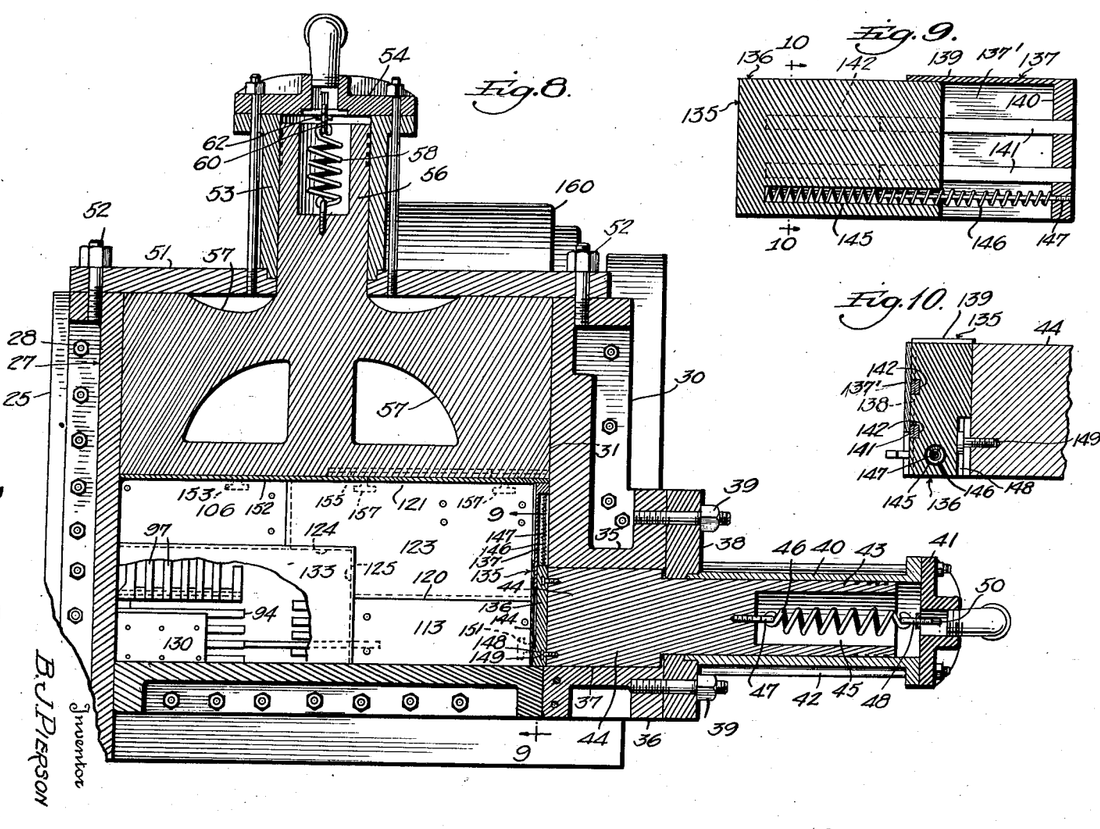
Figure 8 is a horizontal sectional view through the apparatus taken on line 8—8 of Figure 1.
Figure 9 is an enlarged fragmentary sectional view on line 9—9 of Figure 8.
Figure 10 is a similar view on line 10—10 of Figure 9.

A heavy plate 51 (Figures 2 and 3) extends across the rear ends of the guide members 27 and 30 and is secured at its ends to the respective guide members as at 52. A cylinder 53 has one end seated against the plate 51 and is provided at its outer end with a head 54. Bolts 55 secure the head 54 to the cylinder and secure the cylinder 53 to the plate 51. A piston 56 is reciprocable in the cylinder 53 and is connected to a slide 57 elongated transversely of the axis of the cylinder 53. This slide is supported upon the upper face of the adjacent portion of the plate 25 and has its edges in sliding engagement with the respective guide members 27 and 30 (Figure 8). The structure of the piston 56 is similar to the piston 43, being recessed in its end to contain a spring 58 secured at its inner end as at 59 to the piston 56 and having its outer end engaging a hook 60. This hook has a polygonal outer end 61 and is threaded in a spider member 62. It will become apparent that the introduction of fluid under pressure in the outer end of the cylinder 53 will move the piston 56 inwardly to transmit pressure to the adjacent edge of the bacon belly.

As previously stated, the lower piston 18 (Figure 4) is movable upwardly to cause the plate 24 to exert an upward force which compresses the bacon belly vertically, the meat lying horizontally within the press chamber. The slides 44 (Figure 4) and 57 (Figure 3) exert forces to compress the belly endwise and sidewise, and accordingly it will be apparent that the press chamber is reducible in size in three dimensions. Accordingly a die-plate or platen formed of a plurality of pieces forms the bottom of the die-chamber and such pieces are slidable with respect to each other to reduce the horizontal dimensions of the press chamber. The individual sections of the platen are supported by a horizontally reducible supporting structure which rests upon the plate 24 so that upon upward movement of the plate 24 a force may be exerted against the adjacent face of the bacon belly, while the platen and its supporting structure will be reducible in size longitudinally and transversely of the apparatus while the forces are being exerted against the end and side edges of the belly.

Figure 11:
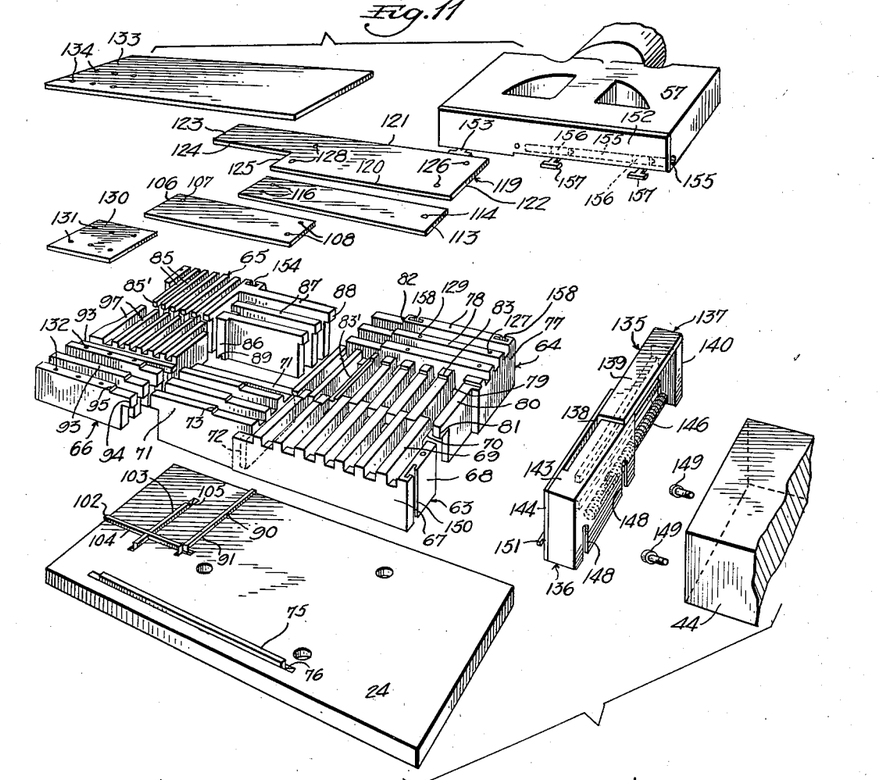
Figure 11 is a detail perspective view showing the end and side pressure members, the platen elements, and the lower pressure member, the parts being separated for the purpose of illustration.
Figure 12:
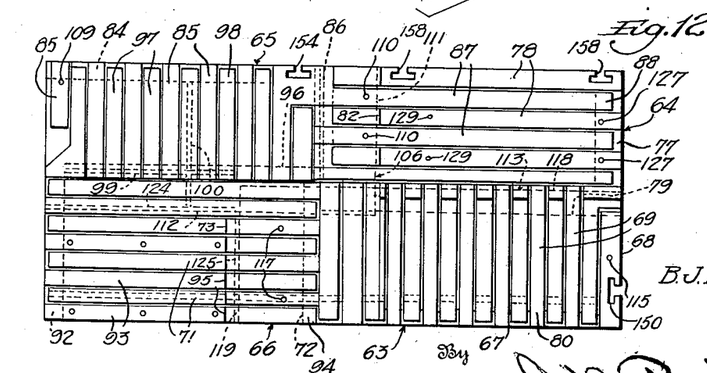
Figure 12 is a plan view of the platen supporting structure shown in contracted position.

Referring to Figures 11 and 12 the numerals 63, 64, 65 and 66 designate respectively a plurality of finger blocks which form the supporting structure for the platen sections to be described. The finger block 63 comprises a vertical wall 67 which extends approximately two-thirds of the length of the block 63 and is arranged longitudinally of the press chamber. The block 63 further comprises an end wall 68 which is shorter than the width of the finger block as a whole. Throughout nearly the entire length of the wall 67, the finger block 63 is provided with a plurality of parallel fingers 69 extending transversely of the die-chamber, each finger being of a width preferably slightly less than the distance between each adjacent pair of fingers, for a reason which will become apparent. The top surfaces of the fingers 69 lie in a common horizontal plane which is substantially above the horizontal plane of the upper edge of the wall 67.

Throughout most of their length, the fingers 69 have their lower edges extending downwardly to the common plane of the lower edges of the walls 67 and 68 to rest upon the plate 24. Adjacent their free ends, the fingers 69 are provided with an extended portion 70 at the top of each finger, for a purpose to be described.

The finger block 63 is further provided with a plurality of longitudinally extending fingers 71 the ends of which project slightly in the same manner as the ends 70 of the fingers 69. The fingers 71 have their inner ends formed integral with a wall 72 which, in turn, is an integral part of the finger block 63. Each finger 71 is preferably of a width slightly less than the distance between each adjacent pair of fingers 71, for a purpose which will become apparent. The top surfaces of the inner ends of all of the fingers 71, except the innermost finger which will be referred to later, lie in the same horizontal plane as the top surfaces of the fingers 69. However, the remote ends of the fingers 71, except the innermost finger, have their top surfaces offset upwardly to a slight extent as at 73, for a purpose to be described.

The bottom of the finger block 63 is provided with a groove slidably receiving a key 75 arranged in a groove 76 formed in the upper face of the plate 24. The groove preferably extends along the bottom edge of the outermost finger 71 and is cut transversely through the lower edges of the fingers 69. Accordingly, it will be apparent that the finger block 63 is fixed against movement transversely of the plate 24 but is slidable longitudinally thereof. The block 63 is connected to be operated by the slide 44 in a manner to be described.

The finger block 64 comprises an end wall 77 having its outer face substantially flush with the corresponding face of the wall 68 of the block 63. A plurality of longitudinally extending fingers 78 are formed integral with the wall 77. The outermost finger 78 is preferably slightly wider than the remaining fingers 78, and each of such remaining fingers is preferably of a width slightly narrower than the space between each adjacent pair of fingers. The finger block 64 further includes a longitudinally extending vertical wall 79 and this wall carries a plurality of transversely extending fingers 80 which are adapted to slide between the fingers 69 when the block 64 is moved laterally of the apparatus upon actuation of the piston 56. The fingers 80 preferably correspond in width to the fingers 69 and since each of the latter is preferably slightly narrower than each of the spaces therebetween, it will be noted that suitable clearance is provided between the fingers 69 and 80. Each finger 80 is provided with an extended end 81 (Figure 11) which overlies the upper edge of the adjacent portion of the wall 67 when the parts are in the position shown in Figure 12. The projecting ends 70 of the fingers 69 similarly overlie the upper edge portions of the wall 79 under similar conditions.

The fingers 78 and 80 are shouldered as at 82 and 83 respectively, along the lines at right angles to each other thus defining with the wall 77 and the outermost finger 78 a rectangle, the surfaces of which are arranged slightly above the common plane of the top surfaces of the fingers 69 and the top surfaces of the greater portion of the fingers 80. However, one of the fingers 80 is shouldered as at 83' in alignment with the shoulders 82 and the top surfaces of the fingers 80 to the left of the shoulder 83' as viewed in Figure 11 are arranged slightly below the common plane of the top surfaces of the major portions of the remaining fingers 80. Such depressed surfaces of the fingers 80 to the left of the shoulder 83' lie in the common plane of the top surfaces of the fingers 78 to the left of the shoulders 82 as viewed in Figure 11. Such depressed surfaces also lie in the same plane as the top surface of the innermost finger 71. The purpose of this construction will be referred to later. As previously stated, the fingers 80 slide laterally of the apparatus between the fingers 69, and the block 64 necessarily must be free to move longitudinally of the apparatus upon actuation of the piston 43 (Figure 4). Accordingly, the finger block 64 is not keyed to the plate 24 as is the block 63 and is not secured in any way to the plate 24, but is free to slide over the surface thereof. The lower edge surfaces of all of the fingers and walls of the block 64 lie in a common plane engaging the surface of the plate 24.

The finger block 65 comprises a vertical longitudinal wall 84 (Figure 12) having its outer face lying in the vertical plane of the outer face of the outermost finger 78. This wall carries a plurality of integral fingers 85 which extend laterally of the apparatus, the space between each adjacent pair of these fingers being slightly greater than the width of the individual fingers for a purpose to be described. The inner ends of the fingers 84 are provided with a slight overhang 85', similar to the projecting ends 70 and 81 of the fingers 69 and 89. The block 65 further comprises a transverse wall 86 from which project integral vertical longitudinally extending fingers 87 having projecting ends 88. When the finger block 64 is moved longitudinally toward the block 65, the fingers 78 and 87 slide between each other and the projecting ends 88 overlie the upper edge of the wall 77.

The lower edge of the wall 86 is provided with a groove 89 slidably receiving a key 90 normally arranged in a groove 91 formed in the plate 24 and extending transversely thereof. Accordingly, it will be apparent that the finger block 65 is fixed against longitudinal movement with respect to the plate 24 but is slidable thereon transversely of the plate. The finger block 65, as in the case of the block 64, is movable laterally across the plate 24 upon actuation of the piston 56 (Figure 3). The lower edges of the fingers 85 and 87 and walls 84 (Figure 12) and 86 lie in a common horizontal plane to rest upon the plate 24. The upper edge surfaces of the fingers 85 and 87 lie in the horizontal plane of the top surfaces of the adjacent ends of the fingers 78, and accordingly are slightly below the level of the top surfaces of the fingers 69.

The finger block 66 comprises a vertical end wall 92 (Figure 12) extending transversely of the apparatus, and integral vertical fingers 93 are carried by such end wall and extend longitudinally of the apparatus. These fingers slide between the fingers 71 and are provided with projecting ends 94 adapted to overlie the upper edge of the wall 72 when the blocks 63 and 66 are in collapsed position with respect to each other. The top surfaces of the free end portions of the fingers 93 lie in the same common horizontal plane as the top surfaces of the portions of the fingers 72 extending from the bottoms of the shoulders 73. Except for the innermost finger 93, the portions of the top surfaces of the ends of the fingers 93 toward the end wall 92 are arranged at a slightly higher plane than the top surfaces of the inner ends of the fingers 93 and at the same level as the top surfaces of the free ends of the fingers 71. The top surface of the innermost finger 93 lies in the same plane as the top surfaces of the fingers 85.

The finger block 66 further comprises a vertical longitudinally extending wall 96 (Figure 12) carrying integral vertical fingers 97 extending transversely of the apparatus and preferably provided with projecting ends 98, similar to the projecting ends of others of the fingers described, and adapted to overlie the upper edge of the wall 84. The fingers 97 have their top surfaces lying in the plane of the top surfaces of the fingers 85 and the top surface of the innermost finger 93. The fingers 97 are adapted to slide between the fingers 85, and as is true of the remaining interfitting fingers of the structures described, the fingers 85 and 97 are slightly narrower than the spaces therebetween to provide clearance between the fingers. The finger block 66 is suitably grooved longitudinally and transversely as at 99 and 100 to receive keys 102 and 103 normally arranged in grooves 104 and 105 respectively, formed in the upper face of the plate 24. Accordingly, it will be apparent that the finger block 66 is fixed against both transverse and longitudinal movement with respect to the plate 24. The finger block 66 is the only one of the blocks described which is so fixed, the block 63 being slidable longitudinally on the plate 24, the block 64 being both transversely and longitudinally slidable, and the block 65 being transversely slidable. This arrangement of the parts permits the collapsing of the supporting structure described both longitudinally and transversely with the fingers of the supporting structure interfitting, to reduce the horizontal dimensions of the supporting structure to its minimum limits as shown in Figure 12.

A platen structure is formed of a plurality of separate platen elements super-imposed with relation to each other and so placed as to be relatively slidable to reduce the length and breadth of the platen structure upon operation of the two horizontal pistons 43 and 56. Referring to Figures 11 and 12 the various platen elements are shown with relation to each other and to the supporting structure previously described. The lowermost element of the platen structure is indicated by the numeral 106 and is in the form of a rectangular plate having an opening 107 in one corner and a pair of openings 108 adjacent the opposite end. The opening 107 is adapted to receive a screw which is threaded in an opening 109 (Figure 12) in the finger 85 adjacent the upper left hand corner of Figure 12. The openings 108 receive screws which are threaded in openings 110 formed in two of the fingers 87 of the finger block 65. Accordingly it will be apparent that the platen element 106 is directly secured to the finger block 65 to be rigid therewith. The left hand and top edges of the platen element 106, as viewed in Figure 12, coincide with the corresponding limits of the finger block 65. The right hand end of the platen element 106 occupies the dotted line position 111 in Figure 12 when the parts are in collapsed position, while the lower edge of this platen element, as viewed in Figure 12, occupies the position shown by the dotted line 112.

The next relatively higher platen element is designated by the numeral 113 and this element also is rectangular in shape. An opening 114 is formed in the right hand end of the plate as viewed in Figures 11 and 12 to receive a screw threaded in an opening 115 formed in the end wall 68 of the finger block 63, the adjacent end of the plate 113 coinciding with the vertical plane of the outer face of the wall. Adjacent its other end, the platen element 113 is provided with a pair of openings 116 receiving screws threaded in openings 117 formed in two of the fingers 71. Accordingly it will be apparent that the platen element 113 is secured against the top face of the finger block 63. Attention is invited to the fact that the finger surfaces against which the bottom of the platen element 113 lies are arranged above the surfaces of the finger elements which contact with the plate 106, the vertically off-set distances between such surfaces being equal to the thickness of the plate 106. In other words, the top surface of the plate 106 will lie in the same horizontal plane as the top surface of the fingers 69 and the portions of the fingers 71 and 78 which are flush therewith. It will become apparent, therefore, that when the supporting structure is in the collapsed position, the corner of the plate 113 which is adjacent the plate 106 is adapted to slide thereover. In this connection it will be noted that the inner longitudinal edge of the platen element 113 has been indicated by the dotted line 118 in Figure 12, while the inner transverse edge of such element has been designated by the dotted line 119. Thus it will be apparent that the adjacent corner portions of the elements 106 and 113 will overlap in the collapsed position of the parts, the inner overlapping corner of the element 106 being indicated by the dotted lines 111 and 112, as previously stated.

The next higher platen element has been indicated in Figure 11 by the numeral 119, this plate having parallel inner and outer edges 120 and 121 and end edges 122 and 123. One corner of the element 119 is cut away as indicated by the longitudinal and transverse edges 124 and 125. Adjacent the end 122, the element 119 is provided with openings 126 to receive screws threaded in openings 127 (Figure 12) formed in the fingers 78 near the end thereof adjacent the wall 77 of the finger block 64. Inwardly of the edge 125, the element 119 is also provided with a pair of openings 128 to receive screws threaded in openings 129 also formed in two of the fingers 78.

The edges 121 and 122 of the element 119 are respectively in vertical alignment with the back and right hand limits of the finger block 64 as viewed in Figure 12. It will be noted that the element 119 is supported on the portions of the fingers 78 which lie to the right of the shoulders 82 and rearwardly of the shoulders 83 (Figure 11) the top surfaces of such portions of the fingers 78 lying above the top surfaces of the fingers 80 below the shoulders 83 a distance equal to the thickness of the element 113. Accordingly the portions of the lower surface of the element 119 which overlie portions of the element 113 are slidable thereover. It will be noted that the top surfaces of the fingers 93 to the left of the shoulders 95 (Figure 11) and the top surfaces of the fingers 71 to the left of the shoulders 73 lie in a common horizontal plane and when the parts are in the fully collapsed position the shoulders 73 and 95, as shown in Figure 12, are arranged in alignment with each other and are parallel to the adjacent edge 125 of the element 119. The edge 124 of the element 119 will be parallel to the fingers 93 as shown in dotted lines in Figure 12. The edges 124 and 125 and the lower and left hand limits of the finger block 63, as viewed in Figure 12 define a rectangular space over the higher portions of the fingers 93 for a purpose to be described.

A shim 130 is arranged in the rectangular space referred to and is supported by the higher top surfaces of the fingers 93. This shim is equal in thickness to the platen element 119 and is provided with a plurality of openings 131 registering with openings 132 formed in the tops of certain of the fingers 93. The shim 130 supports the uppermost platen element which is designated in Figure 11 by the numeral 133. This element is rectangular as shown and is provided with openings 134 registering with the openings 131 and 132 to receive screws which are threaded in the openings 132 to secure the element 133 and shim 130 in position. The shim 130 being equal in thickness to the element 119, it will be apparent that the bottom surface of the element 133 is adapted to slide over the upper surface of the element 119.

From the foregoing it will be apparent that each of the platen elements is carried by one of the finger blocks and is movable therewith, and it also will be apparent that each of the platen elements is arranged at proper different levels to permit them to slide with respect to each other. These platen elements preferably are formed of stainless steel approximately one-eighth inch thick, and it has been found in practice that they form a highly effective platen structure for exerting an upward force against the bottom surface of a bacon belly arranged in the press chamber.

As previously stated, the finger block 66 is stationary on the plate 24, the keys 102 and 103 preventing any movement of the block 66. All of the remaining finger blocks are adapted to slide over the surface of the plate 24 and each is provided with means for effecting the necessary sliding movement. Referring to Figures 4, 8, 9, 10 and 11 the numeral 135 designates a header which is adapted to be actuated by the piston 43 to slide both of the finger blocks 63 and 64 toward the left as viewed in Figures 4, 8, 11 and 12. This header comprises a pair of complementary members 136 and 137, the member 136 being in the form of a substantially rectangular block. The member 137 is of angular cross-section and includes a wall 137' slidable over the adjacent or inner face of the block 136, and a top wall 139 which slides over the corresponding top surface of the block 136. The member 137 also includes an end wall 140 as clearly shown in Figures 9 and 11. Keys 141 are carried by the forward wall 138 of the member 137 and preferably extend therebeyond. These keys operate in slots 142 formed in the inner face of the member 136. Thus it will be apparent that the members 136 and 137 telescope with respect to each other.

Adjacent its end opposite the member 137, the member 136 is provided with an outwardly offset portion 143 the depth of which is approximately equal to the thickness of the wall 138 of the member 137. A face plate 144 is secured to the portion 143 and is of sufficient length to overlie a portion of the outer face of the wall 138 when the member 137 is in its fully extended position.

The member 136 (Figures 9 and 10) is provided with a cylindrical opening 145 to receive one end of a compression spring 146 and the other end of this spring seats against the inner face of the wall 140. A rod 147 is preferably threaded into the wall 140 and extends into the adjacent end of the spring 146 to prevent the buckling of the latter between the wall 140 and the adjacent end of the block 136. It will be apparent that the inner face portions of the header 135 are adapted to engage the adjacent faces of the walls 68 and 77 to effect movement of the finger blocks 63 and 64 toward the left as viewed in Figure 11.

The header 135 is detachably connected to the slide 44 to be positively retracted thereby when pressure is released from the outer end of the cylinder 40. The face of the block 136 adjacent the slide 44 is provided with T-slots 148 which open through the bottom of the block 136, as shown in Figures 10 and 11. These slots receive the heads of screws 149 carried by the slide 44. Accordingly it will be apparent that the header 135 is adapted to slide vertically into position, the heads of the screws 149 entering the lower ends of the slots 148. The header may be equally readily moved by being lifted vertically.

In order to provide for the positive retraction of the finger blocks 63 and 64, means is provided for positively connecting the finger block 63 to the header 135. As shown in Figures 11 and 12, the wall 68 of the finger block 63 is provided with a T-slot 150. This slot is adapted to receive a T-shaped element 151 carried by the face plate 144. The element 151 obviously effects positive retraction of the finger block 63, and due to the interfitting of the fingers 69 and 80, it will be apparent that movement of the finger block 63 longitudinally of the plate 24 will effect corresponding movement of the finger block 64. The element 151 is capable of relative vertical sliding movement in the slot 150, thus permitting the plate 24, the finger blocks and the platen structure to move vertically to perform the vertical pressing operation.

Referring to Figures 3 and 11, it will be noted that a face plate 152 is secured against the inner end of the plate 57. Near one end, a T-shaped member 153 is rigidly connected to the slide 57 and projects from the plate 152 for engagement in a T-shaped vertical slot 154 formed in the adjacent wall of the finger block 65. It will be recalled that this block partakes only of lateral movement with respect to the plate 24 and for this reason the member 153 can be made rigid with the slide 57. Near the opposite side of the slide 57 the inner edge of the slide is provided with an elongated slot 155 in which is arranged a pair of slides 156 each carrying a T-shaped projection 157, these projections preferably corresponding in shape and size to the member 153. Each of the projections 157 is vertically slidable in a T-shaped slot 158 formed in the rearmost fingers 78 of the finger block 64.

It will be apparent that the elements 153 and 157 engage the finger blocks 64 and 65 to effect positive movement of the blocks laterally with respect to the plate 24 upon movement of the slide 57. As previously stated, the block 65 partakes only of lateral movement with respect to the plate 24, while the block 64 partakes of both lateral and longitudinal movement. For this reason the elements 157 are provided with the heads 156 which slide in the guide groove 155, the finger block 64 thereby being permitted to move longitudinally with respect to the plate 24 as well as laterally thereof in accordance with the movement of the slide 57.

Figure 13:
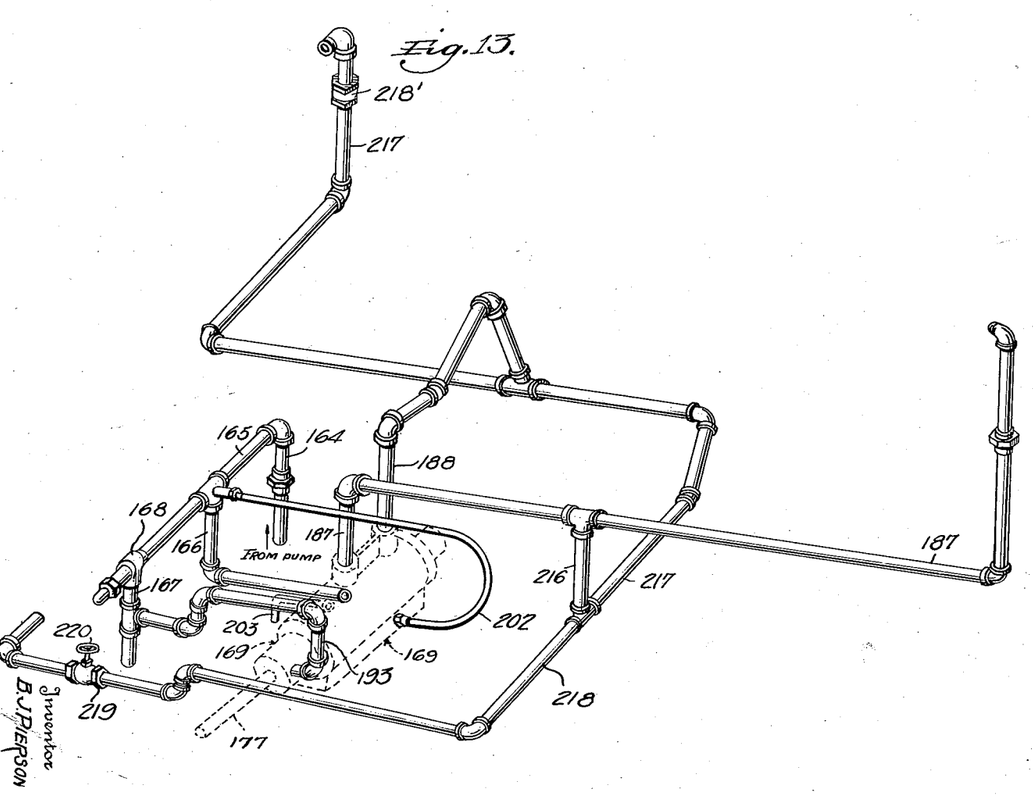
Figure 13 is a diagrammatic perspective view of the piping connections for the system.

A readily controllable system is provided for supplying pressure fluid to the three rams and for releasing the fluid therefrom. A motor 160 is mounted against the base of the apparatus and, through the medium of any suitable transmission means such as a chain 161, the motor drives a conventional pump 162 (Figure 4) arranged within the reservoir formed in the base 10. The pump is provided with an inlet pipe 163 having its end extending into the body of oil 13 to directly supply oil to the pump. An outlet pipe 164 is connected to the pump and extends vertically upwardly through the top of the base as shown in Figure 4. This vertical pipe is also shown in Figure 13 in which the system of distribution of the oil is shown. Above the base, the pipe 164 is connected to a horizontal pipe 165 having two pipes 166 and 167 leading therefrom. The pipe 167 extends downwardly into the base 10 to return oil thereto. In the joint between the pipes 165 and 167 a pressure release valve 168 is arranged, and this valve may be designed and adjusted for any suitable pressure whereby oil in the pipe 165 will flow through the valve 168 and thus be returned to the reservoir when the pressure in the pipe 165 reaches the pressure for which the valve 168 is adjusted. In the actual apparatus, it is preferred that the valve 168 be set to open under a pressure of approximately one hundred and fifty pounds per square inch.

Figures 6, 7:
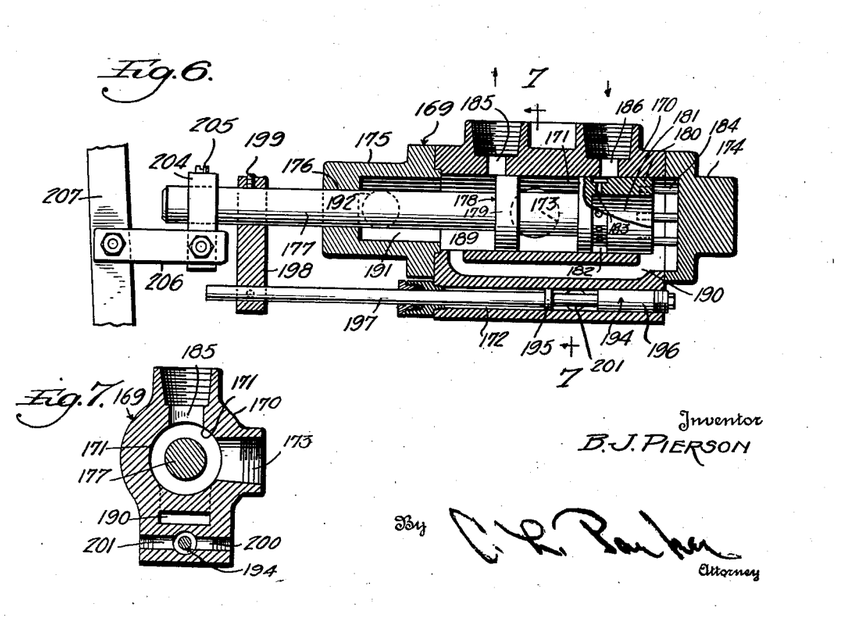
Figure 6 is an enlarged vertical sectional view through the valve mechanism, taken substantially on line 6—6 of Figure 1, parts being shown in elevation and parts being broken away.
Figure 7 is a transverse sectional view through the valve mechanism, taken substantially as indicated by the line 7—7 of Figure 6.

The pipe 166 supplies oil to a valve mechanism indicated as a whole by the numeral 169, this valve mechanism being operable for admitting oil to the several hydraulic rams and for releasing the oil from the rams to be returned to the reservoir in a manner to be described. The valve mechanism 169 comprises a valve body 170 having a relatively large cylindrical bore 171 therein parallel to which is a smaller cylindrical bore 172. The bore 171 communicates with the oil supply pipe 166 through a port 173 (Figures 6 and 7).

The valve body is provided at opposite ends with heads 174 and 175 the latter of which is provided with a bearing opening 176 slidably receiving a valve stem 177. A valve indicated as a whole by the numeral 178 is arranged in the bore 171 and is connected to the stem 177. This valve comprises spaced heads 179 and 180 the latter of which is elongated and is provided in its end with a cylindrical recess 181. Adjacent its inner end, the head 180 is provided with an annular groove 182 and within this groove the head 180 is provided with radial openings 183 communicating between the groove 182 and the recess 181. The head 180 is provided with pins 184 engageable with the head 174 to limit the movement of the valve toward the head for a purpose which will become apparent.

The valve body is provided with a pair of ports 185 and 186 connected respectively to pipes 187 and 188 and these pipes are adapted to supply oil under pressure and return the oil from the rams in a manner to be described. When the valve 178 is in the position shown in Figure 6 the port 185 communicates with the space 189 to the left of the valve head 179, while the port 186 communicates through the groove 182, openings 183 and recess 181 with the right hand end of the valve port 171. Opposite ends of the valve bore are in fixed communication with each other through a by-pass 190.

The valve head 175 is provided with an axial recess 191 communicating with the space 189, and the valve head 175 is ported as at 192 for communication with a pipe 193 (Figure 13). This pipe leads to and communicates with the oil return pipe 167. When the valve 178 is in the position shown in Figure 6, therefore, both of the valve ports 185 and 186 will be in communication with the oil return pipe 167 and the valve head 179 will close communication between the inlet port 173 and the outlet port 185. Accordingly no oil can flow from the port 173 into the valve body, while pressure in the pipe lines to be described will be released by permitting oil to return to the reservoir through pipe 167.

In order to eliminate the necessity for starting and stopping the oil pump with each pressing operation, it is desirable to provide means for permitting the pump to continue its operation when the valve 178 is in the position shown in Figure 6. For this purpose a valve indicated as a whole by the numeral 194 is slidable in the bore 172 and comprises a relatively short head 195 and an elongated head 196 spaced therefrom. The valve 194 is provided with a valve stem 197 connected by an arm 198 to the valve stem 177.

A set screw 199 is preferably provided for adjusting the arm 198 along the stem 177 to adjust the position of the valve 194 with respect to the valve 178. The valve bore 172 is provided with an inlet port 200 and an outlet port 201. The port 200 is connected by a pipe 202 (Figure 13) to the pipe 165 while a pipe 203 has one end connected to the port 201 and its other end leading to the reservoir to return oil thereto. The space between the heads 194 and 195 affords communication between the pipe 202 and 203 to by-pass oil from the pipe 165 to the reservoir when the valve 178 is in closed position shown in Figure 6. Thus the necessity for stopping the operation of the pump at the end of each pressing operation is eliminated.

Figure 5:
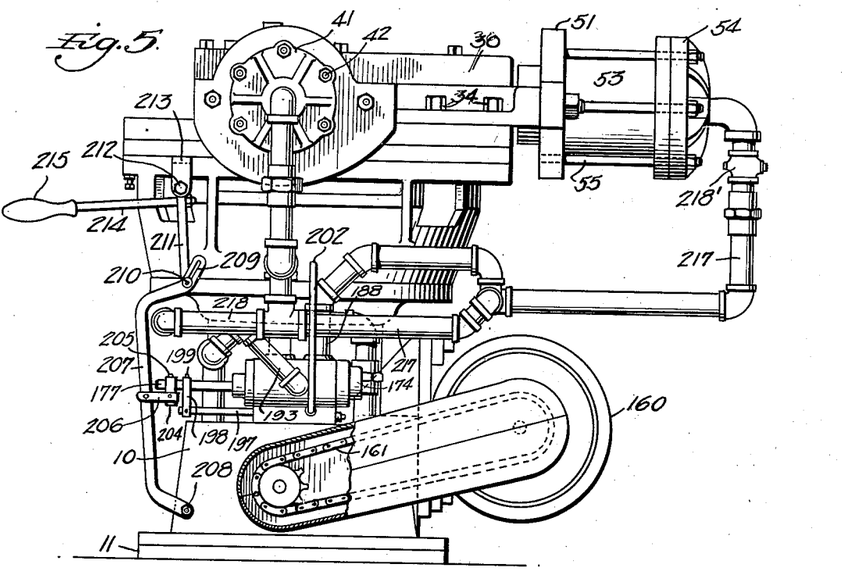
Figure 5 is an end elevation of the apparatus.

As shown in Figures 5 and 6, a yoke 204 is mounted on the end of the valve stem 177 and is preferably adapted to be fixed in adjusted positions with respect thereto by a set screw 205. The yoke 204 is pivotally connected at its lower end to one end of a link 206 and this link has its other end connected to a lever 207, the lower end of this lever being pivotally connected as at 208 to the base 10. The lever 207 is shaped intermediate its ends to avoid interference with the piping connections shown, and the upper end of the lever is provided with a slot 209 receiving a pin 210 carried by the lower end of an arm 211. This arm is pivotally connected at its upper end as at 212 to an ear 213 carried by the flange 22. An arm 214 is secured at its inner end to the arm 211 and the outer end of the arm 214 is provided with a handle 215. It will be apparent that the arms 211 and 215 constitute a bell crank lever adapted to turn to impart movement to the lever 207 and thus operate the valves 178 and 194.

Referring to Figure 13 it will be apparent that the pipe 187 constitutes the main pipe for supplying oil to the 3 hydraulic rams. The pipe 187 has its end connected to the cylinder head 41 (Figure 4) to supply oil to the outer end of the cylinder 40. A branch pipe 216 is connected into the pipe 187 and is branched to supply oil to the pipes 217 and 218 the former of which, as shown in Figure 3, is connected to the cylinder head 54 to supply oil to the cylinder 53. The pipe 218 is connected to the lower end of the cylinder 17, as shown in Figure 4.

For reasons to be described it is preferred that the sequence of operation of the three rams be controlled in definite ways. In practically every operating condition it is preferred that the piston 43 (Figures 4 and 8) be operated in advance of either of the pistons 56 or 18. Accordingly, the pipe 187 supplies oil without restriction to the cylinder 40. The pipe 217 is provided with a control valve 218' to somewhat restrict the flow of oil into the cylinder 54 and accordingly the piston 56, while operating simultaneously with the piston 43 will lag behind the piston 43 in its operation. The valve 218' is adjustable but need not be provided with a manually operable handle since its adjustment is fixed under practically all conditions.

The pipe 218 is provided with a control valve 219 which may be of the same type as the valve 218 except that it is preferably provided with a manually operable handle 220. Ordinarily, the valve 219 remains partially open but restricts the flow of oil to the cylinder 17 to a greater extent than the valve 218' restricts the flow of oil to the cylinder 53. The manually operable handle is preferably provided, since, under conditions to be described, it is sometimes desirable to close the valve 219 until both of the pistons 43 and 56 have reached their limits of movement, whereupon the valve 219 is opened to provide the vertical pressing operation.

The operation of the apparatus is as follows:

Both of the pistons 43 and 56 are normally held in their retracted positions by their respective springs 46 and 58. When it is desired to use the apparatus, the motor 160 is started in operation and drives the chain 161 to operate the pump 162. This pump immediately starts to pump oil from the reservoir within the base 10, the oil flowing into the pump through the inlet 163 and being discharged through the pipe 164. Such operation is started assuming that the valves 178 and 194 are in the positions shown in Figure 6.

The operation of the pump therefore pumps oil under pressure through the pipe 164 to the pipe 165 (Figure 13) and since no oil can flow into the valve body 170 (Figure 6) because of the positions of the heads 179 and 180 with respect to the inlet port 173, and because the valve 168 opens only at a predetermined pressure, the oil will flow from the pipe 165 through pipe 202 (Figure 13) through ports 200 and 201 (Figure 7), these ports being arranged between the heads 195 and 196 in the positions shown in Figure 6 and thence back to the reservoir through the pipe 203. This circuit for the oil provides a by-pass which is open constantly when the valve 178 is in inoperative position, and accordingly it will be apparent that the pump 162 is permitted to operate continuously.

When it is desired to press a bacon belly, the operator, using one of the flanges 33 (Figures 2 and 3) as a handle, will move the slide 32 to the right as viewed in Figure 3 thus opening the top of the press chamber. The bacon belly, with the skin removed is placed in the press chamber and will be supported therein by the elements constituting the platen structure. The operator then moves the slide or cover 32 back to its operative position shown in Figure 3, whereupon the press chamber will be completely closed and the apparatus will be ready for operation.

The operator will then pull upwardly on the handle 215 (Figure 5) thus swinging the arm 211 and lever 207 toward the left as viewed in Figures 5 and 6 to operate the valves 178 and 194. The head 179 will move across the port 185 to afford communication between the ports 173 and 185, and at the same time, the head 196 will move across the ports 200 and 201 (Figure 7) to close communication between these ports. Accordingly communication will be established between the ports 173 and 185 at the same time that the previously operating by-pass through the pipe 202 is closed.

Upon opening movement of the valve 178, therefore, the oil under pressure will flow from the port 173 through the port 185 into the pipe 187 (Figure 13) and will be distributed to the three hydraulic rams described. The pipe 187 provides an unrestricted flow of oil to the cylinder 40 (Figure 4) to move the piston 43 inwardly. Oil also flows through pipes 216 and 217 to the cylinder 53 (Figure 3). The regulating valve 218' is preferably regulated to such a position that the flow of oil therethrough will be slower than the flow of oil through the pipe 187 to the cylinder 40. Therefore, while the pistons 43 and 56 will be simultaneously operated, the movement of the piston 56 will lag behind the movement of the piston 43, and accordingly the belly will be fully compressed longitudinally before it is fully compressed transversely. Thus the belly will be re-formed horizontally into a rectangular shape. The advantage of this sequence of operation will be referred to later.

In most cases, the regulating valve 219 (Figure 13) will be partially closed so that the rate of flow of oil therethrough will be slower than the rate of flow of the oil through the regulating valve 218'. Accordingly the piston 18 (Figure 4) will operate simultaneously with the two horizontal pistons referred to but its speed of operation will cause it to lag behind the movement of the transverse piston 56. Therefore the full vertical compression of the bacon belly will be the last operation which is completed.

All bacon bellies are irregular in shape before being pressed, as stated, and this is particularly true of the ends. The first few slices from the ends of the belly constitute scrap which goes into the making of sausages and similar prepared meats, while the several succeeding slices, while sufficient in length to be sold as bacon are considered to be inferior and are sold at a lower price than the full length bacon strips. Since it is desirable to square the ends of the belly and since the greatest irregularity occurs at the ends, the piston 43 is acted upon by an unrestricted flow of oil through the pipe 187 in order that the endwise pressing may be completed first. Accordingly the ends of the belly are deformed sufficiently to square them before the lateral and vertical pressing actions take place to a sufficient extent to interfere with the endwise deforming of the meat.

The laterally operating piston 56 follows behind the piston 43 and provides straight parallel edges on the belly after the ends have been squared. The operation which is completed last is the vertical pressing, this operation being completed after all of the edges of the belly have been squared and performs the function of deforming the belly through its thickness to render the two faces of the meat parallel to each other. In connection with the various pressing operations, attention is invited to the fact that the belly need not be frozen prior to being pressed in the press, but is preferably placed in the pressing chamber while relatively cold in which case the fat content of the meat will be substantially congealed with the result that the pressing operations may be carried out in the manner stated and the belly immediately taken from the press without losing its squared pressed form. In practice it has been found that the bellies may be quickly and efficiently pressed if they are placed in the pressing chamber at a temperature of approximately 37° F.

If the pressing operations are carried out in the present apparatus under the conditions of temperature and operating sequences described, the complete pressing operation requires only a very few seconds for its completion. While the three pistons of the hydraulic rams move one behind the other as regards their speed of movement, they all operate simultaneously, and accordingly no lost time is involved between the three operations. As stated, all of the operations are completed in a few seconds' time, and as soon as movement of the remaining pistons is stopped upon completion of the pressing operation, it will be obvious that there will be an immediate rise in pressure in the various pipe lines between the control valve and the several cylinders. This rise in pressure occurs quickly when movement of the pistons stops and opens the valve 168 (Figure 13) to permit oil to escape into the pipe 167 and thence back into the reservoir, thus preventing any further increase in pressure in the system.

The chattering of the pressure release valve 168 informs the operator of the completion of the compressing operation, whereupon he may move the handle 215 (Figure 5) downwardly to restore the parts to normal position. This operation moves the valves 178 and 194 toward the right as viewed in Figure 6, thus stopping the admission of oil into the valve body 170 through the port 173 and at the same time moving the valve 194 to the position shown in Figure 6 to restore communication between the pipes 202 and 203 (Figure 13), thus by-passing the pumped oil back to the reservoir. As stated, it is unnecessary to stop the operation of the pump, the by-pass system being of sufficient cross-sectional area to by-pass oil back to the reservoir as rapidly as it is pumped.

It will be apparent that when the valves are returned to their normal position, the groove 182 (Figure 6) will communicate with the port 186 and this port communicates with the pipe 188 (Figure 13). Accordingly oil is free to flow from the pipe 188 through port 186, groove 182, openings 183, recess 181, passage 190, space 189, recess 191, port 192 and pipe 193 (Figure 13) back to the reservoir through the pipe 167. The pipe 188 as shown in Figure 13, is connected to the pipe 217 which is in communication with the pipe 218 and also communicates with the pipe 187 through the branch 216. Accordingly oil will be drained from all of the three ram cylinders to permit the pistons of the rams to return to their normal positions. The horizontal pistons 43 and 56 are provided with springs 46 and 58 respectively which operate to return the pistons to normal position when the fluid pressure is released. The piston 18 need not be provided with a return spring since the weight of this piston plus the weight of the plate 24, the several finger blocks and the platen structure, are sufficient to return the piston 18 to its normal lower position when the fluid pressure is released from the cylinder 17.

Particular attention is invited to the platen structure and to the finger blocks acting as supports therefor. The finger block 65 is movable only transversely of the plate 24, being slidable on the key 90. The platen element 106 is secured to the block 65 and moves therewith. The element 106 forms the lowermost platen element and it will become apparent that these elements are so arranged and vertically positioned as to permit them to overlap in the collapsed position of the finger blocks. The level of the upper faces of the fingers 85 is in a common plane with the upper surfaces of the fingers 87, the upper faces of the fingers 97, the uppermost faces of the two innermost fingers 71 and 93, and the upper faces of the free ends of the fingers 78. The limits of the area within which such common plane lies is such that when the finger blocks are in fully collapsed position it will be substantially filled by the element 106.

The platen element 113 is the next to the lowest element and is supported on the upper faces of the fingers 69. The element 113 also extends over the inner ends of the fingers 71 and is secured to these fingers and to the wall 68 by screws passing through the openings 115 and 117. The surfaces of the fingers 80 at the bottoms of the shoulders 83 are in the same common plane with the surfaces to which the platen element 113 is secured and such surface is approximately flush with the top surface of the element 106 when the latter is secured to the finger block 65. Accordingly the innermost corner portion of the element 113 is adapted to slide over the adjacent corner portion of the element 106, as indicated in dotted lines in Figure 12, the inner edges of the element 106 being designated by the numerals 111 and 112 and the inner edges of the element 113 being designated by the numerals 118 and 119. The element 113 is of such size and shape as to fit within the corner area of the supporting structure defined by the shoulders 73 and 83 and the outer faces of the walls 67 and 68 when the supporting structure is in its fully collapsed position.

The element 119 is the next higher element and is secured to the finger block 64 by screws passing through the openings 126 and 128 into the openings 127 and 129. The shoulders 83 are of a depth equal to the thickness of the element 113, and accordingly the lower face of the element 119 is adapted to slide over the upper face of the element 113 in contact therewith. When the supporting structure is in its fully collapsed position, if it should ever reach such position, the edge 120 of the element 119 will move to a position coinciding with the vertical plane of the outer face of the wall 67, the greatest width of the element 119 as indicated by the edge 122 being equal to the combined width of the finger blocks 63 and 64 when the latter are in fully collapsed position.

The shim 130 is secured to certain of the fingers 93 by screws passing through the openings 131 and threaded in the openings 132. The width of the first three fingers 93 and the distance between the shoulders 95 and the outer face of the remote end wall 92 of the finger block 66 define a rectangle equal in size and shape to the shim 130 and the latter element is supported on the surfaces of the fingers 93 lying within such area. The element 133 forms the topmost element of the platen structure and is secured in position on the shim 130, the screws which pass through the opening 131 also passing through the openings 134 of the platen element 133. The shim 130 is supported on the higher surfaces of the fingers 93 and is of such thickness as to elevate the platen element 133 to a position wherein its lower surface is substantially in the plane of the top surface of the element 119 and is slidable thereover. The top element 133 is rectangular and corresponds in size and shape to the four finger blocks when the latter are in the fully collapsed position shown in Figure 12.

It will be apparent that both of the finger blocks 64 and 65 partake of transverse movement with respect to the plate 24. The block 65 is fixed against movement longitudinally of the plate but the block 64 is movable longitudinally while being moved transversely of the plate 24. Accordingly the T-member 153, which engages the slot 154 of the finger block 65 is fixed with respect to the slide 57 while the T-members 157 are slidable longitudinally of the face plate 152 since they engage in the slots 158 of the finger block 64. Therefore, as the slide 57 is moved upon actuation of the piston 56, the T-members 153 and 157 will effect lateral movement of the respective finger blocks 65 and 64 transversely of the plate 24, and the slidable mountings of the T-members 157 slide to permit the finger block 64 to move longitudinally of the plate 24 under the pressure of the header 135 as will be described. The face plate 152 forms the transversely movable longitudinal side wall of the press chamber. Its lower edge engages against the adjacent faces of the finger blocks 64 and 65 and the T-members referred to operate to retract these finger blocks when fluid pressure is released from the cylinder 53 (Figure 3).

The inner face of the face plate 144 and the corresponding face of the complementary member 137 form the longitudinally movable transverse wall of the press chamber and are connected to the slide 44 to be actuated thereby upon movement of the piston 43 (Figure 4). The lower portion of the inner face of the face plate 144 contacts with the wall 68 of the finger block 63 to move the latter inwardly and the T-element 151 is vertically slidable in the slot 150 and acts to retract the finger block 63 when fluid pressure is released from the cylinder 40. The finger block 64 is caused to move longitudinally of the plate 24 through the interengagement of the fingers 69 and 80.

The right hand end of the face plate 152 as viewed in Figure 11 contacts with the adjacent end of the complementary member 137 when the slide 57 moves inwardly to perform a pressing operation, and accordingly the complementary member 137 telescopes with respect to the complementary member 136, the combined lengths of these members always defining the width of the press chamber depending upon the positions of the parts. Upon the retraction of the slide 57, the spring 146 moves the complementary member 137 away from the member 136, as will be apparent.

Upon longitudinal sliding movement of the finger block 63 the fingers 71 move between the fingers 93 and if the fully collapsed position of the parts is reached, the projecting ends of the fingers 71 will overlie the wall 92 as shown in Figure 12. Longitudinal movement of the finger block 64 causes the fingers 78 to similarly move between the fingers 87. In a similar manner, transverse movement of the blocks 64 and 65 toward the blocks 63 and 66 causes the fingers 80 and 85 to move between the fingers 69 and 97. It will be apparent that relationship of the elements of the supporting structure to the platen structure is such as to provide adequate and substantially uniform supporting of the platen structure and that all of the elements of the latter structure are always arranged wholly within the press chamber, it being unnecessary for any of these elements to be movable laterally beyond the limits of the press chamber.

The movement of the parts for providing the vertical operation will be apparent. As previously stated, oil under pressure will be forced into the bottom of the cylinder 17 to force the piston 18 upwardly. Thus while the movable elements of the finger block structure are being horizontally moved by the actuating means associated therewith, the plate 24 (Figure 4) will be moving the finger block structure and the platen structure upwardly to cause the latter to vertically compress the bacon belly, the vertical pressure being taken up by the slide 32 which constitutes the top of the press chamber.

After the various operations referred to have been completed, the pistons of the three hydraulic rams are returned to their normal or inoperative positions in the manner described, whereupon the operator may push the slide 32 to the right as viewed in Figure 3, thus opening the press chamber. The operator may then remove the pressed belly from the press chamber and immediately place another belly in position to be pressed. This operation may be continually repeated and inasmuch as the entire operation of pressing a bacon belly requires only a few seconds, a single pressing apparatus has a very large daily production and accordingly is very economical in operation. The meat as pressed may be sliced substantially in its entirety as "No. 1" meat, thus eliminating the substantial losses involved in cutting away a number of slices of bacon from each end of the belly before reaching the points at which full-length strips of bacon may be cut.

In this connection, attention is invited to the fact that it is not only desirable to provide full-length bacon strips but also to provide strips which are fairly wide since they possess the best appearance and are more easily marketable. Most bellies are of such natural thickness that the apparatus may be operated in accordance with the normal sequence described, all of the pistons of the rams being simultaneously operable with the vertical pressing operation being the one last completed. Some bellies are normally relatively thinner and in the performance of the normal sequence of the operations described the resultant product will be thinner than is desirable.

When an operator places an unusually thin bacon belly in the press, therefore, he will rotate the handle 220 (Figure 13) before operating the handle 215 (Figure 5) to start the operation of the apparatus. Under such conditions, no oil will flow to the cylinder 17 and the piston 18 will remain in its lower position. Both of the horizontal rams will be operated, however, and after both horizontal pressing actions have been completed, the operator may open the valve 219. Under such conditions, the completion of the horizontal pressing operations will result in horizontally reducing the size of the belly more than takes place in the normal sequence of operation and the deforming of the belly in this manner results in the substantial thickening thereof. When the valve 219 is opened, therefore, the vertical pressing operation cannot reduce the average thickness of the belly but will merely flatten the two sides thereof. The resultant product, therefore, will be sufficiently thick to provide attractive and readily marketable bacon slices.

The arrangement of the vertical ram beneath the pressing chamber together with the slidable top plate 32 is highly advantageous inasmuch as the top plate is readily slidable to open the press chamber at its top, thus facilitating the placing of bellies in the press and the removal of the belly therefrom. The guides for the plate 32 are rigidly fastened to the body of the apparatus and accordingly provide ample strength for holding the plate 32 against upward movement. This plate is also sufficiently thick and properly designed to provide the necessary structural strength while at the same time it is freely slidable to open the press, as stated.

Except where reference is made to the top plate, it is to be noted that the expressions "vertical," "horizontal" etc. as defining the positions of the walls of the press chamber are intended to be purely relative terms and are not intended to limit the positions of the portions of the apparatus referred to.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A press comprising a pair of relatively movable end structures, a pair of relatively movable side structures and a pair of spaced horizontal structures defining a press chamber, one of said horizontal structures being arranged between said end and side structures and being formed of at least four elements relatively movable whereby said last named horizontal structure is adapted to assume a shape and size corresponding to the shape and size of the space between said end and side structures.

2. A press comprising relatively movable end structures, relatively movable side structures and relatively movable horizontal structures defining a press chamber, and means for relatively moving said members to effect a three-directional pressing of an article in said chamber, one of said horizontal structures comprising at least four elements constructed to move between said end and side structures and constructed to be horizontally expansible and contractible in size in accordance with the relative positions of said end and side structures.

3. A press comprising a pair of end structures, a pair of side structures and a pair of horizontal structures defining a press chamber therebetween, one of each pair of said structures being fixed and the other being mounted for movement toward the fixed structure of the pair, one of said structures comprising a platen assembly formed of at least four elements relatively movable with respect to each other whereby said assembly is contractible and expansible in area.

4. A press comprising a pair of end structures, a pair of side structures and a pair of horizontal structures defining a press chamber therebetween, one of each pair of said structures being fixed and the other being mounted for movement toward the fixed structure of the pair, one of said horizontal structures being movable into the space between said end and side structures and comprising a platen assembly formed of at least four elements relatively movable whereby said assembly is expansible and contractible in accordance with the relative positions of said end and side structures.

5. A press comprising a pair of end structures, a pair of side structures and a pair of horizontal structures defining a press chamber therebetween, one of each pair of said structures being fixed and the other being mounted for movement toward the fixed structure of the pair, one of said structures comprising a platen assembly formed of a plurality of elements relatively movable with respect to each other whereby said assembly is contractible and expansible in area, said last named structure further comprising a supporting assembly for said platen assembly formed of a plurality of inter-engaging members constructed for relative movement with respect to each other.

6. A press comprising a pair of end structures, a pair of side structures and a pair of horizontal structures defining a press chamber therebetween, one of each pair of said structures being fixed and the other being mounted for movement toward the fixed structure of the pair, said movable horizontal structure comprising at least four relatively movable platen elements and a supporting assembly therefor comprising at least four inter-engaging relatively movable elements, the elements of said platen and supporting assemblies being constructed and arranged whereby both of said assemblies are expansible and contractible in size in accordance with the relative positions of said end and side structures.

7. A press comprising a pair of relatively movable end structures, a pair of relatively movable side structures and a pair of relatively movable horizontal structures, a source of power for each pair of structures for effecting relative movement thereof toward each other, manually controllable means for simultaneously energizing all of said sources of power, and automatic means inter-relating the operations of all of said sources for positively controlling said sources of power to effect operation of at least two of said sources simultaneously but at different speeds.

8. A press comprising a pair of relatively movable end structures, a pair of relatively movable side structures and a pair of relatively movable horizontal structures, a separate source of power for each pair of structures for effecting relative movement thereof toward each other, means for controlling said power sources to effect simultaneous operation thereof, and means constructed and arranged with respect to at least two of said power sources to cause them to operate at successively slower speeds than the other power source.

9. A press comprising a pair of relatively movable end structures, a pair of relatively movable side structures and a pair of relatively movable horizontal structures, one of said horizontal structures comprising at least four elements movable into the space between said end and side structures and constructed to be horizontally reducible in size in accordance with relative movement of said end and side structures toward each other, and fluid pressure operated means for effecting relative movement of each pair of structures.

10. A press comprising a pair of relatively movable end structures, a pair of relatively movable side structures and a pair of relatively movable horizontal structures, one of said horizontal structures comprising at least four elements movable into the space between said end and side structures and constructed to be horizontally reducible in size in accordance with relative movement of said end and side structures toward each other, fluid pressure operated means for effecting relative movement of each pair of structures, and control means for said fluid pressure operated means constructed to effect operation of at least two of said fluid pressure operated means simultaneously but at different speeds.

11. A press comprising a pair of end structures, a pair of side structures and a pair of horizontal structures defining a press chamber therebetween, one of each pair of said structures being fixed and the other being mounted for movement toward the fixed structure of the pair, one of said structures comprising a platen assembly formed of a plurality of elements relatively movable with respect to each other whereby said assembly is contractible and expansible in area, power means for operating the movable structure of each pair, and means connected to control the operation of the structure of which said platen assembly is a part to cause such structure to complete a pressing operation after the completion of the pressing operations by said end and side structures.

12. A press comprising a pair of end structures, a pair of side structures and a pair of horizontal structures defining a press chamber therebetween, one of each pair of said structures being fixed and the other being mounted for movement toward the fixed structure of the pair, one of said structures comprising a platen assembly formed of a plurality of elements relatively movable with respect to each other whereby said assembly is contractible and expansible in area, power means for operating the movable structure of each pair, control means connected to render all of said power means operative simultaneously, and means connected to cause a lagging of the operation of the power means of either said end or side structures and a further lagging of the operation of the power means of the structure comprising said platen assembly.

13. A press comprising a pair of end structures, a pair of side structures and a pair of horizontal structures defining a press chamber therebetween, one of each pair of said structures being fixed and the other being mounted for movement toward the fixed structure of the pair, one of said structures comprising a platen assembly formed of a plurality of elements relatively movable with respect to each other whereby said assembly is contractible and expansible in area, power means connected to actuate the movable structure of each pair, control mechanism for rendering all of said power means simultaneously operative, and auxiliary control means connected to control the energization of the power means of the end or side structures and said horizontal structure whereby said power means are caused to operate at different speeds.

14. A press comprising three pairs of wall structures one of each pair of which is movable to provide a three-directional pressing of an article therebetween, a fluid pressure operated device connected to each movable wall structure, a source of fluid pressure, a single valve controlling the admission of pressure fluid from said source to said devices and the releasing of the fluid pressure therefrom, and auxiliary valve means connected between said single valve and at least one of said devices to relatively retard the speed of operation of the latter.

15. A press comprising three pairs of wall structures one of each pair of which is movable to provide a three-directional pressing of an article therebetween, a fluid pressure operated device connected to each movable wall structure, a source of fluid pressure, a single valve controlling the admission of pressure fluid from said source to said devices and the releasing of the fluid pressure therefrom, one of said devices having a substantially unrestricted flow of pressure fluid from said valve, an auxiliary valve connected between said single valve and one of the other devices to retard its speed of operation with respect to said first named device, and an auxiliary valve connected between said first named valve and the remaining device and manually controllable to determine the speed of operation of said remaining device.

16. A press comprising a pair of relatively movable end structures, a pair of relatively movable side structures and a pair of horizontal structures one of which is stationary and the other of which is movable into the space between said end and side structures, said structures cooperating to form a press chamber, said movable horizontal structure comprising a platen assembly formed of at least four plates arranged between said end and side structures and relatively slidable with respect to each other to alter the area of said platen assembly in accordance with the positions of said end and side structures.

17. A press comprising a pair of relatively movable end structures, a pair of relatively movable side structures and a pair of horizontal structures one of which is stationary and the other of which is movable into the space between said end and side structures, said structures cooperating to form a press chamber, said movable horizontal structure comprising a platen assembly formed of at least four plates arranged between said end and side structures and relatively slidable with respect to each other to alter the area of said platen assembly in accordance with the positions of said end and side structures, said movable horizontal structure further comprising a supporting assembly for said platen assembly.

18. A press comprising a pair of relatively movable end structures, a pair of relatively movable side structures and a pair of horizontal structures one of which is stationary and the other of which is movable into the space between said end and side structures, said structures cooperating to form a press chamber, said movable horizontal structure comprising a platen assembly formed of at least four plates arranged between said end and side structures and relatively slidable with respect to each other to alter the area of said platen assembly in accordance with the positions of said end and side structures, said movable horizontal structure further comprising a supporting assembly formed of at least four elements having inter-fitting engagement and relatively movable to alter the size of said supporting assembly coincident with and in correspondence to movement of the plates of said platen assembly.

19. A press comprising a pair of relatively movable end structures, a pair of relatively movable side structures and a pair of horizontal structures one of which is stationary and the other of which is movable into the space between said end and side structures, said structures cooperating to form a press chamber, said movable horizontal structure comprising a platen assembly formed of at least four plates arranged between said end and side structures and relatively slidable with respect to each other to alter the area of said platen assembly in accordance with the positions of said end and side structures, said movable horizontal structure further comprising a supporting assembly for said platen assembly comprising at least four corner blocks each having fingers extending at right angles to each other and inter-engageable with the fingers of the adjacent blocks whereby said blocks are relatively movable to increase and reduce the size of said supporting assembly coincident with and in correspondence to alterations in the size of said platen assembly.

20. A press comprising a pair of relatively movable end structures, a pair of relatively movable side structures and a pair of horizontal structures one of which is stationary and the other of which is movable into the space between said end and side structures, said structures cooperating to form a press chamber, said movable horizontal structure comprising a platen assembly formed of at least four plates arranged between said end and side structures and relatively slidable with respect to each other to alter the area of said platen assembly in accordance with the positions of said end and side structures, said movable horizontal structure further comprising a supporting assembly for said platen assembly, said supporting assembly having surface portions at different levels to which the respective elements of said platen assembly are supported whereby such elements are arranged in different planes to slide with respect to each other.

21. A press comprising a pair of relatively movable end structures, a pair of relatively movable side structures and a pair of horizontal structures one of which is stationary and the other of which is movable into the space between said end and side structures, said structures cooperating to form a press chamber, said movable horizontal structure comprising a platen assembly formed of at least four plates arranged between said end and side structures and relatively slidable with respect to each other to alter the area of said platen assembly in accordance with the positions of said end and side structures, said movable horizontal structure further comprising a supporting assembly formed of at least four elements having interfitting engagement and relatively movable to alter the size of said supporting assembly coincident with and in correspondence to movement of the plates of said platen assembly, the elements of said supporting assembly having top surfaces at different levels to which the respective elements of said platen assembly are secured whereby such elements are supported at different levels to move in overlapping sliding relationship to each other.

22. A press comprising a pair of relatively movable end structures, a pair of relatively movable side structures and a pair of horizontal structures one of which is stationary and the other of which is movable into the space between said end and side structures, said structures cooperating to form a press chamber, said movable horizontal structure comprising a platen assembly formed of at least four plates arranged between said end and side structures and relatively slidable with respect to each other to alter the area of said platen assembly in accordance with the positions of said end and side structures, said movable horizontal structure further comprising a supporting assembly for said platen assembly comprising at least four corner blocks each having fingers extending at right angles to each other and inter-engageable with the fingers of the adjacent blocks whereby said blocks are relatively movable to increase and reduce the size of said supporting assembly coincident with and in correspondence to alterations in the size of said platen assembly, said blocks corresponding in number to the elements of said platen assembly and being constructed and arranged to respectively support said elements at different levels whereby they are adapted to slide in overlapping relationship with each other.

23. A press comprising stationary and movable end walls, stationary and movable side walls, and stationary and movable horizontal walls defining a press chamber, a fluid pressure motor connected to each movable wall, said movable horizontal wall comprising a platen assembly and a supporting assembly therefor movable between said end and side walls, said assemblies each comprising at least four corresponding relatively movable elements respectively connected to each other whereby they are simultaneously operable to reduce and increase said assemblies in size in accordance with the space between said end walls and said side walls, a fluid pressure operated motor connected to each of said movable end and side walls, and means connecting said end and side walls to the adjacent elements of said supporting structure to move them in accordance with the movement of said movable end and side walls.

24. A press comprising stationary and movable end walls, stationary and movable side walls, and stationary and movable horizontal walls defining a press chamber, a fluid pressure motor connected to each movable wall, said movable horizontal wall comprising a platen assembly and a supporting assembly therefor movable between said end and side walls, said assemblies each comprising at least four corresponding relatively movable elements respectively connected to each other whereby they are simultaneously operable to reduce and increase said assemblies in size in accordance with the space between said end walls and said side walls, a fluid pressure operated motor connected to each of said movable end and side walls, and means connecting said end and side walls to the adjacent elements of said supporting structure to move them in accordance with the movement of said movable end and side walls, said platen assembly comprising relatively flat plates relatively slidable in overlapping relationship at least during a portion of the relative movement of such plates.

25. A press comprising stationary and movable end walls, stationary and movable side walls, and stationary and movable horizontal walls defining a press chamber, a fluid pressure motor connected to each movable wall, said movable horizontal wall comprising a platen assembly and a supporting assembly therefor movable between said end and side walls, said assemblies each comprising at least four corresponding relatively movable elements respectively connected to each other whereby they are simultanously operable to reduce and increase said assemblies in size in accordance with the space between said end walls and said side walls, a fluid pressure operated motor connected to each of said movable end and side walls, and means connecting said end and side walls to the adjacent elements of said supporting structure to move them in accordance with the movement of said movable end and side walls, the elements of said supporting assembly having inter-engaging portions relatively uniformly supporting said platen assembly in any relative positions of the elements of said supporting assembly.

26. A press comprising stationary and movable end walls, stationary and movable side walls, and stationary and movable horizontal walls defining a press chamber, a fluid pressure motor connected to each movable wall, said movable horizontal wall comprising a platen assembly and a supporting assembly therefor movable between said end and side walls, said assemblies each comprising at least four corresponding relatively movable elements respectively connected to each other whereby they are simultaneously operable to reduce and increase said assemblies in size in accordance with the space between said end walls and said side walls, a fluid pressure operated motor connected to each of said movable end and side walls, and means connecting said end and side walls to the adjacent elements of said supporting structure to move them in accordance with the movement of said movable end and side walls, the elements of said platen assembly being relatively slidable in overlapping relationship at least during a portion of the relative movement of such plates, the elements of said supporting assembly having inter-engaging portions relatively uniformly supporting said platen assembly in any relative positions of the elements of said supporting assembly.

27. A press comprising stationary and movable end walls, stationary and movable side walls, and stationary and movable horizontal walls defining a press chamber, a fluid pressure motor connected to each movable wall, said movable horizontal wall comprising a platen assembly and a supporting assembly therefor movable between the elements of said end and side walls, said assemblies each comprising at least four corresponding relatively movable elements respectively connected to each other whereby they are simultaneously operable to reduce and increase said assemblies in size in accordance with the space between said end walls and said side walls, a fluid pressure operated motor connected to each of said movable end and side walls, and means connecting said end and side walls to the adjacent elements of said supporting structure to move them in accordance with the movement of said movable end and side walls, the elements of said supporting assembly comprising a plurality of blocks each having sets of spaced fingers extending approximately at right angles to each other and interengaging with fingers of the adjacent blocks to provide substantially uniformly distributed supporting surfaces for said platen assembly.

28. A press comprising stationary and movable end walls, stationary and movable side walls, and stationary and movable horizontal walls defining a press chamber, a fluid pressure motor connected to each movable wall, said movable horizontal wall comprising a platen assembly and a supporting assembly therefor movable between said end and side walls, said assemblies each comprising at least four corresponding relatively movable elements respectively connected to each other whereby they are simultaneously operable to reduce and increase said assemblies in size in accordance with the space between said end walls and said side walls, a fluid pressure operated motor connected to each of said movable end and side walls, and means connecting said end and side walls to the adjacent elements of said supporting structure to move them in accordance with the movement of said movable end and side walls, the elements of said platen assembly comprising relatively flat plates relatively slidable in overlapping relationship at least during a portion of the relative movement of such plates, the elements of said supporting assembly comprising a plurality of blocks each having sets of spaced fingers extending approximately at right angles to each other and interengaging with fingers of the adjacent blocks to provide substantially uniformly distributed supporting surfaces for said platen assembly.

29. A press comprising a pair of vertical end walls one of which is movable, a pair of vertical side walls one of which is movable, and top and bottom walls, power means for actuating said movable walls, said bottom wall being arranged between the lower portions of said vertical walls and being formed of at least four elements constructed and arranged to be relatively movable whereby said bottom wall is expansible and contractible in accordance with the relative positions of said vertical walls, said top wall being movable to open the press at the top thereof.

30. A press comprising a pair of vertical end walls one of which is movable, a pair of vertical side walls one of which is movable, and top and bottom walls, power means for actuating said movable walls, said bottom wall being arranged between the lower portions of said vertical walls and being formed of at least four elements constructed and arranged to be relatively movable whereby said bottom wall is expansible and contractible in accordance with the relative positions of said vertical walls, and means for supporting said top wall for sliding movement horizontally away from the press to open the latter at its top.

31. A press comprising a pair of vertical end walls one of which is movable, a pair of vertical side walls one of which is movable, and top and bottom walls the latter of which is vertically movable and is arranged between said end and side walls, power means for actuating said movable walls, said bottom comprising a platen assembly formed of at least four elements and a supporting assembly therefor comprising at least four elements each fixed to one of the elements of said platen assembly, the elements of said platen and supporting assemblies being constructed and arranged to be relatively movable whereby said bottom wall is adapted to assume a shape and size corresponding to the shape and size of the space between said vertical walls in any relative positions of the latter, said top wall being movable away from the press to open the latter at the top thereof.

32. A press comprising a pair of vertical end walls one of which is movable, a pair of vertical side walls one of which is movable, and top and bottom walls the latter of which is vertically movable and is arranged between said end and side walls, power means for actuating said movable walls, said bottom wall comprising a platen assembly formed of at least four elements and a supporting assembly therefor comprising at least four elements each fixed to one of the elements of said platen assembly, the elements of said platen and supporting assemblies being constructed and arranged to be relatively movable whereby said bottom wall is adapted to assume a shape and size corresponding to the shape and size of the space between said vertical walls in any relative positions of the latter, and a pair of horizontal guides for said top wall supporting the latter for horizontal movement away from the press to open the latter at its top.

33. A press comprising a pair of end structures, a pair of side structures and a pair of horizontal structures defining a press chamber therebetween, one of each pair of said structures being fixed and the other being mounted for movement toward the fixed structure of the pair, said structures being constructed and arranged relative to each other to provide a three-directional pressing action, power means for actuating the movable structure of each pair, manually controllable means for simultaneously energizing all of said power means, and automatic means inter-relating the operations of all of said power means to control the operation of the movable horizontal structure to cause such structure to complete a pressing operation after the completion of the pressing operations by said end and side structures.

34. A press comprising a pair of end structures, a pair of side structures and a pair of horizontal structures defining a press chamber therebetween, one of each pair of said structures being fixed and the other being mounted for movement toward the fixed structure of the pair, said structures being constructed and arranged relative to each other to provide a three-directional pressing action, power means for actuating the movable structure of each pair, control means connected to render all of said power means simultaneously operative, and means connected to cause a lagging of the operation of the power means of either said end or side structures and a further lagging of the operation of the power means of the movable horizontal structures.

35. A press comprising a pair of end structures, a pair of side structures and a pair of horizontal structures defining a press chamber therebetween, one of each pair of said structures being fixed and the other being mounted for movement toward the fixed structure of the pair, said structures being constructed and arranged relative to each other to provide a three-directional pressing action, power means for actuating the movable structure of each pair, control mechanism for rendering all of said power means simultaneously operative, and auxiliary control means connected to control the energization of the power means of the end or side structures and said horizontal structures whereby such power means are positively caused to operate at different speeds.

BENJAMIN J. PIERSON.